(12) United States Patent
Astecker et al.

(10) Patent No.: US 10,774,881 B2
(45) Date of Patent: Sep. 15, 2020

(54) FRICTION DEVICE

(71) Applicant: Miba Frictec GmbH, Laakirchen (AT)

(72) Inventors: Stefan Astecker, Schoerfling (AT); Stefan Gaigg, Gmunden (AT)

(73) Assignee: Miba Frictec GmbH, Laakirchen (AT)

( * ) Notice: Subject to any disclaimer, the term of this patent is extended or adjusted under 35 U.S.C. 154(b) by 102 days.

(21) Appl. No.: 16/007,249

(22) Filed: Jun. 13, 2018

(65) Prior Publication Data

US 2019/0010992 A1    Jan. 10, 2019

(30) Foreign Application Priority Data

Jul. 5, 2017  (AT) .............................. A 50555/2017

(51) Int. Cl.
*F16D 13/68*      (2006.01)
*F16D 13/52*      (2006.01)

(52) U.S. Cl.
CPC .......... *F16D 13/68* (2013.01); *F16D 13/683* (2013.01); *F16D 13/52* (2013.01); *F16D 2200/003* (2013.01); *F16D 2200/0021* (2013.01); *F16D 2250/00* (2013.01); *F16D 2250/0023* (2013.01); *F16D 2300/12* (2013.01)

(58) Field of Classification Search
CPC ......... F16D 13/68; F16D 13/683; F16D 13/52
See application file for complete search history.

(56) References Cited

U.S. PATENT DOCUMENTS

| 1,415,841 | A | * | 5/1922 | Seitz | ....................... F16D 13/68 |
| | | | | | 192/70.2 |
| 4,356,901 | A | * | 11/1982 | Koehler | ................ F16D 13/683 |
| | | | | | 188/218 XL |
| 5,386,899 | A | * | 2/1995 | Sterling | ................ F16D 13/683 |
| | | | | | 188/73.37 |
| 2011/0067971 | A1 | | 3/2011 | Ratner | |
| 2014/0291107 | A1 | | 10/2014 | Lister et al. | |

FOREIGN PATENT DOCUMENTS

| DE | 692 387 C | 6/1940 | |
| DE | 10 2010 008 735 A1 | 10/2011 | |
| DE | 102013206217 A1 * | 10/2013 | ............. F16D 13/52 |
| DE | 102014203959 A1 * | 9/2014 | ........... F16D 13/683 |

OTHER PUBLICATIONS

Machine translation of DE102014203959, retrieved from worldwide.espacenet.com on Jan. 10, 2020 (Year: 2020).*

* cited by examiner

*Primary Examiner* — Stacey A Fluhart
(74) *Attorney, Agent, or Firm* — Collard & Roe, P.C.

(57) ABSTRACT

The invention relates to a friction device (1) comprising a cage-like support element (2), wherein the support element (2) comprises a cage casing which is formed from a plurality of a disks (4) which are arranged consecutively in axial direction (5), comprise an annular main disk body (6) and which each have on their outer periphery (7) or inner periphery (14) a plurality of torque transmission elements (8), wherein gaps (10) are formed respectively between the torque transmission elements (8) in peripheral direction (9) of the disks (4), and the torque transmission elements (8) of the respectively adjacent disk (4) engage in the gaps (10) of the disks (4).

9 Claims, 3 Drawing Sheets

FRICTION DEVICE

CROSS REFERENCE TO RELATED APPLICATIONS

Applicant claims priority under 35 U.S.C. § 119 of Austrian Application No. A 50555/2017 filed on Jul. 5, 2017, the disclosure of which is incorporated by reference.

The invention relates to a friction device comprising a cage-like support element, wherein the support element comprises a cage casing.

The invention also relates to a friction disk for such a friction device, comprising an annular main disk body, which on its outer periphery or inner periphery comprises a plurality of torque transmission elements and on which at least one friction lining is arranged if necessary.

In addition, the invention relates to a method for the production of such a friction disk, comprising the steps: providing an annular main disk body and forming torque transmission elements on an outer or inner periphery of the main disk body, wherein gaps are formed between the torque transmission elements.

In conventional disk couplings the friction disks are held by a so-called disk carrier. The latter is usually designed to be cage-like and comprises a disk carrier rear wall and a casing connected to the latter. The latter are often made in one piece, for example from sheet metal by means of deep drawing. An example of such a disk coupling is shown in DE 10 2010 008 735 A1. For the transmission of torques the disks comprise torque transmission elements on their outer or inner periphery. The latter engage in corresponding tooth-like recesses in the disk carrier or shaft, on which the disks are arranged.

The underlying objective of the present invention is to provide such a disk friction device which has greater modularity.

The objective of the invention is achieved by means of the aforementioned friction device in that the cage casing is formed by a plurality of disks which are arranged consecutively in axial direction, comprise an annular main disk body and on their outer periphery or inner periphery comprise a plurality of torque transmission elements, wherein gaps are formed respectively between the torque transmission elements in peripheral direction of the disks, and the torque transmission elements of the respectively adjacent disk engage in the gaps of the disks.

Furthermore, the objective of the invention is achieved by means of the aforementioned friction disk, in which the torque transmission elements are arranged at an angle to the main disk body.

The objective of the invention is also achieved however by means of the aforementioned method, according to which the torque transmission elements are bent at an angle relative to the main disk body.

It is an advantage here that the casing of the disk carrier is formed by the disks themselves, so that the disk carrier can be restricted to the flat disk carrier rear wall. The disk carrier is thus much simpler and thereby less inexpensive to produce. In addition there is no longer any need to consider having a specific number of disks for the configuration of the disk carrier, as each disk contributes to the formation of the casing of the disk carrier and thus itself provides the space required in the disk carrier. In this way a modular system can be provided for the structure of the friction device.

According to a preferred embodiment of the friction device the torque transmission elements engaging in the gaps bear on both sides against torque transmission elements of the disk comprising said gaps. Thus for the transmission of torque there is no need to establish form-fitting connections first. In addition, in this way it is possible to more easily guide the individual disks during the formation of the frictional connection.

Preferably, torque transmission elements are arranged at an angle to the main disk body, which is selected from a range of 45° to 110°. Particularly in this range it could be observed that relatively high torques can be transmitted, although the friction device consists of a large number of individual "loose" parts.

To improve the alignment of the disks, at least during the formation of a frictional connection between the disks, the disks can comprise rotational alignment elements.

According to another embodiment of the friction device at least one torque transmission lug is arranged in the gaps between the torque transmission elements which extends at least approximately in radial direction. In this way there can be better cohesion between the individual disks during the transmission of torque.

The torque transmission elements can also comprise a recess, in particular an opening, to improve the oiling of the disks.

Preferably, according to another embodiment of the friction device or friction disk at least one friction lining is arranged on the main disk body of the disks. In this way the weight of the friction device can be reduced, as in this embodiment said friction disks also form a portion of the disk carrier respectively.

Preferably, the torque transmission elements are designed in one piece with the respective disk. By means of said embodiment the production of the disks can be simplified significantly and automated.

For a better understanding of the invention the latter is explained in more detail with reference to the following figures.

In a simplified, schematic representation:

Figure 1:
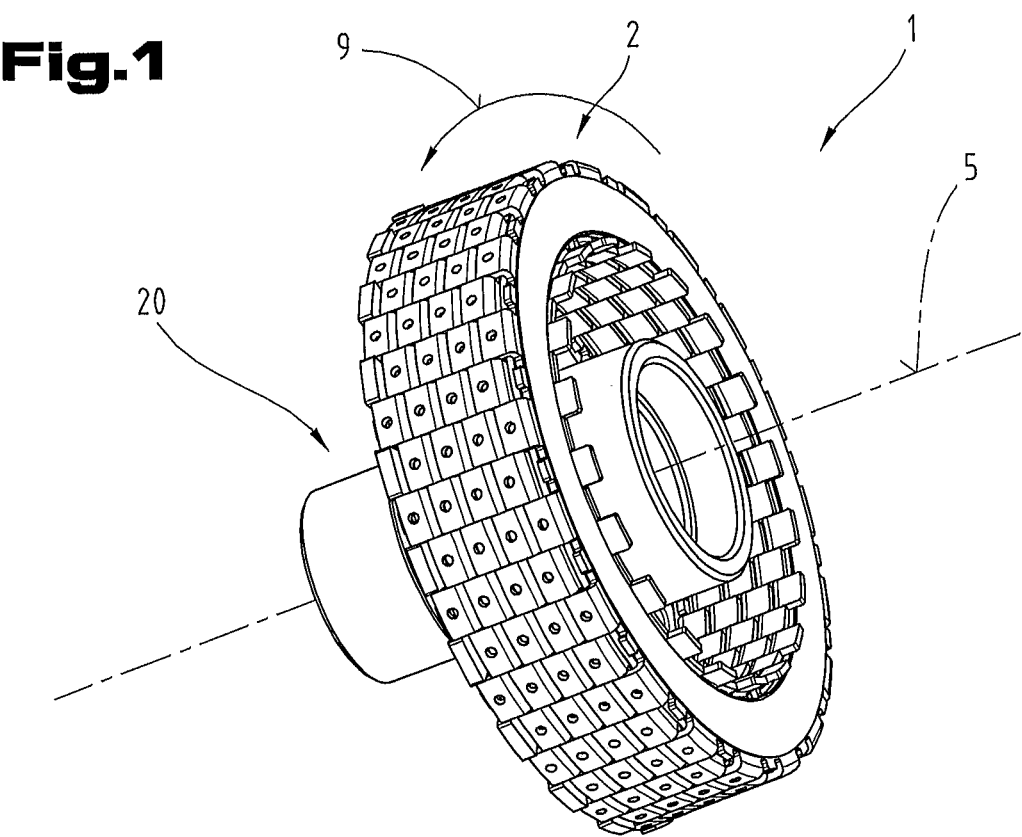
FIG. 1 shows a friction device in perspective view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows a first embodiment of a friction device 1. The latter comprises or consists of a cage-like or pot-shaped support element 2, which comprises a support element rear wall 3, as shown better in FIG. 2, and a plurality of disks 4 which are also shown in an exploded view in FIG. 3. The disks 4 are arranged consecutively in axial direction 5.

The disks 4 form the cage casing of the support element 2, as shown in FIG. 1. For this purpose the disks 4 are designed to have an annular main disk body 6, on which in the specific embodiment a plurality of torque transmission elements 8 are arranged on an outer periphery 7. Between said torque transmission elements 8, i.e. between two of said torque transmission elements 8, gaps are formed respectively in a peripheral direction 9 of the disks 4. As shown in an overview of FIGS. 1 and 3, the torque transmission elements 8 engage in the gaps 10. For this purpose the torque transmission elements 8 of each second disk 4 are offset in peripheral direction 9 of the disks 4 by a width 11 of the torque transmission elements 8 in peripheral direction 9 relative to the torque transmission elements 8 of the disks 4 immediately adjoining the latter. In other words the torque transmission elements 8 of a disk 4 in axial direction 5 are opposite the gaps of the immediately adjacent disk 4.

The torque transmission elements 8 preferably have a length 12 in axial direction 5 which corresponds at least approximately to twice the thickness 13 of the main disk body 6 in axial direction 5. Thus the torque transmission elements 8 in the assembled state of the friction device 1 are offset in axial direction by about 50% of the length 12 relative to the torque transmission elements 8 of the next respective disk 4, as shown in FIG. 1.

In general the torque transmission elements 8 can have a length 12 in axial direction 5 which is selected from a range of 30% to 70% of the thickness 13 of the main disk body 6 in axial direction 5.

Figure 4:
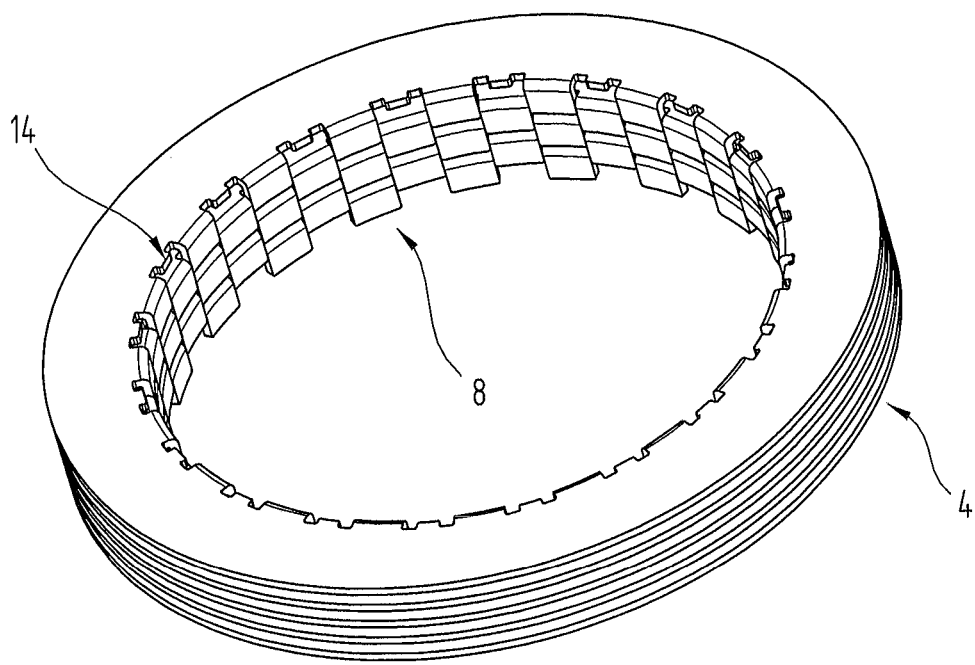
FIG. 4 shows an embodiment of the disks in perspective view.

FIG. 4 shows an embodiment of the disks 4 of the friction device 1 (FIG. 1) forming the cage casing of the support element 2. The only difference from the embodiment described above is that the torque transmission elements 8 are arranged on an inner periphery 14. The explanations above and below relating to the embodiment of the friction device 1 or to details of the friction device 1 thus also relate to said embodiment with the torque transmission elements 8 arranged on the inner periphery 14.

Thus the support element 2 in the described or shown friction devices 1 does not have a separate cage for supporting the friction disks, but the latter is formed by the disks 4. By selecting suitable geometries of the disks 4 the cage casing of the support element 2 of the friction device 1 can be designed to be closed, as shown in FIGS. 1 and 4. For this purpose the torque transmission elements 8 engage in gaps 10 according to one embodiment of the friction device 1 so that they bear respectively on both sides of the torque transmission elements 8 of the disk 4 comprising said gaps 10. In other words the gap width 15 in peripheral direction is the same size as the width 11 of the torque transmission elements 11 in peripheral direction 9. The gap width 15 can be slightly greater in order facilitate the assembly of the disks 4 relative to the cage casing.

It is also possible however that the gap width 15 is greater than the width 11 of the torque transmission elements 11 in peripheral direction 9.

Preferably, the torque transmission elements 8 extend exactly in axial direction 5, as shown in the figures. The torque transmission elements 8 are thus at an angle of 90° to the main disk body 6 of the disk 4 supporting them.

Generally it is possible however that the torque transmission elements 8 are arranged at an angle to the main disk body 6, which is selected from a range of 45° to 110°, in particular from a range of 70° to 100°.

The number of torque transmission elements 8 can vary. For example, the number can be between 20 and 60. In the embodiment shown specifically in FIG. 1 there are 48 torque transmission elements 8. This number should not be considered restrictive.

Figure 3:
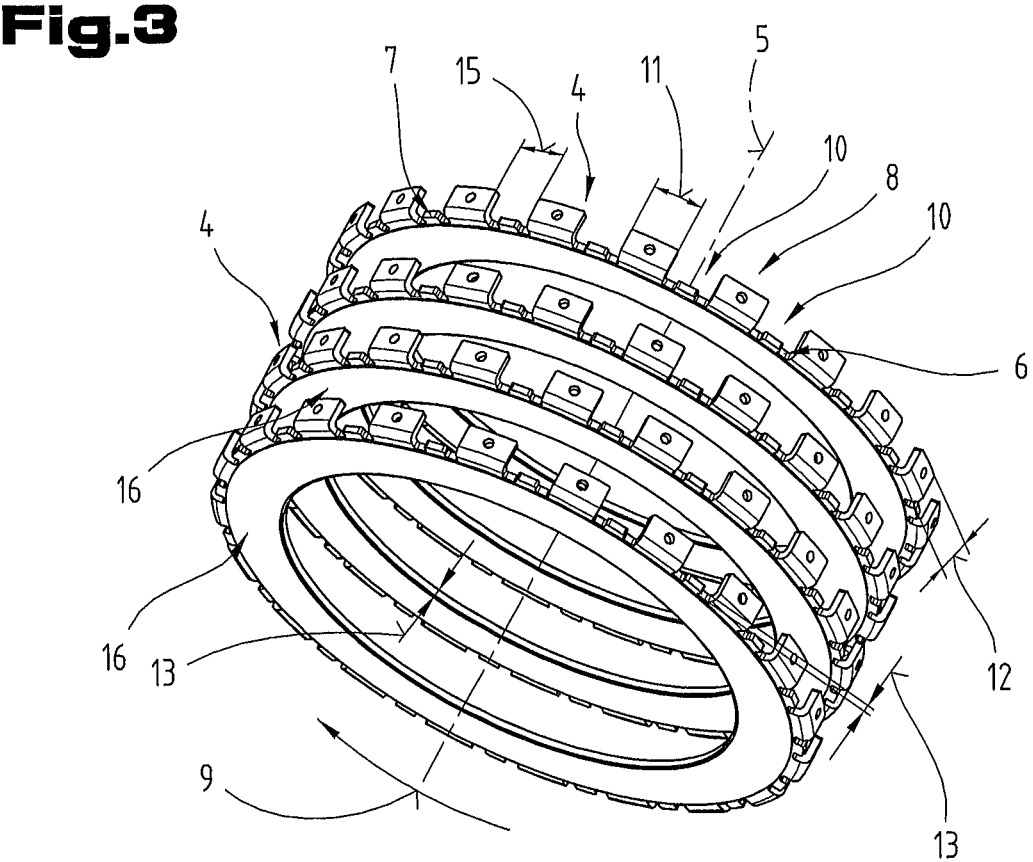
FIG. 3 shows the disks of the friction device according to FIG. 1 in exploded view.

Furthermore, four disks 4 are shown in FIGS. 1, 3 and 4. This number should also not be considered to be restrictive. For example the friction device 1 can have between 2 and 20, in particular between 4 and 12, disks 4.

In principle the torque transmission elements 8 can be arranged at different radial heights so that a kind of toothing is formed into which the friction disks of the friction device 1 engage. This method of fixing of friction disks in disk carriers is known from the prior art which means that there is no need for further explanation of this here.

Preferably, according to one embodiment of the friction device 1 the disks 4 themselves form the friction disks. For this purpose as counter disks the disks 4 can be made of steel or aluminum. However, it is also possible that on the main disk bodies 6 of one or more disks 4 at least one friction lining 16 (FIG. 3) is arranged. Such friction linings 16 are also known from the prior art and reference is made to the latter for further details. For example, the friction linings 16 can be resin-bonded paper linings.

At least one friction lining 16 means on the one hand that the disks can have such friction linings 16 on one or both axial surfaces. This also means that the friction linings 16 can be designed to be annular or in the form of a ring segment or generally in the form of friction lining pads.

By means of the described embodiment of the disks 4 it is no longer necessary to design the disk carrier to be cage-like. The disk carrier can therefore be reduced to the support element rear wall 3 (FIG. 2) of the support elements 2 (FIG. 1). The latter can thus be designed at least approximately to be a planar components which considerably simplifies the production of the latter and makes it less expensive.

Figure 2:
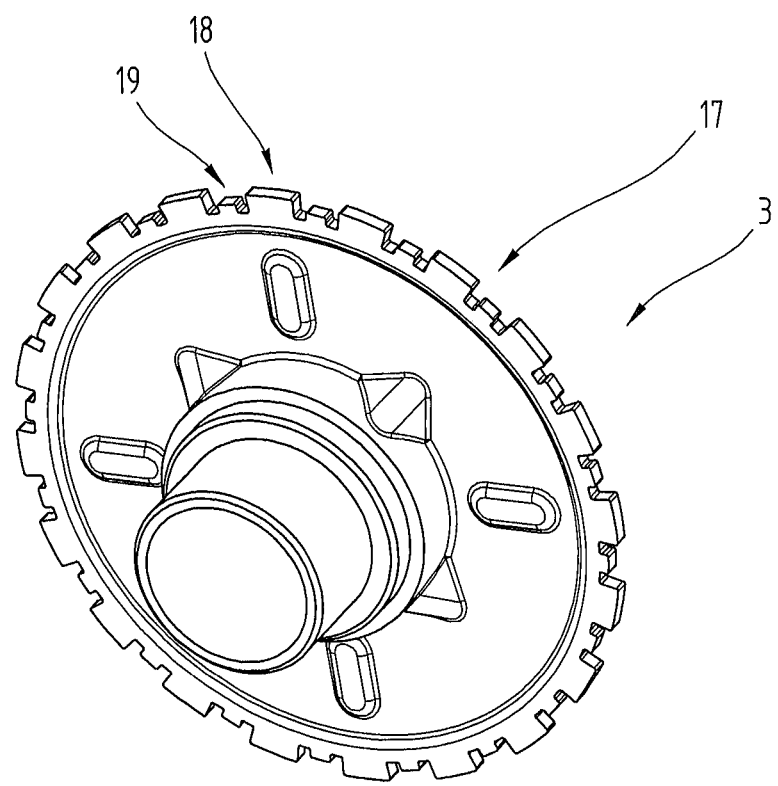
FIG. 2 shows the disk carrier of the friction device according to FIG. 1.
Figure 5:
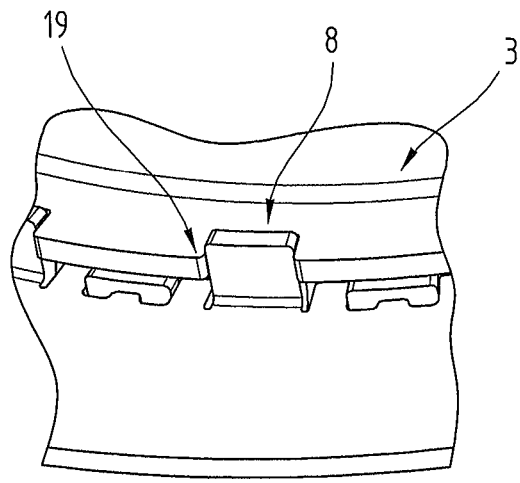
FIG. 5 shows a detail of the friction device in the area of the connection of the disks to the disk carrier.

As shown in FIG. 2, on an outer periphery 17 the support element rear wall 3 comprises a toothing with teeth 18 and tooth gaps 19 formed in between. The torque transmission elements 8 of the disk 4 adjoining the support element rear wall 3 engage in the tooth gaps 19, as shown in FIG. 1 and also in FIG. 5. In this way the transmission of torque is made possible from a shaft 20 to the disks 4, by means of which shaft the support element rear wall 3 is connected in a non-rotational manner.

The disks 4 in particular are sufficiently rigid that they do not require additional support, such as a hub or the like for example.

The same also applies of course to the design of the disks 4 with the torque transmission elements 8 on the inner periphery 14 (FIG. 4).

In such friction devices 1 with disks 4 the frictional connection is formed between so-called outer and inner discs, wherein the respective disks are connected in a rotationally secure manner to a corresponding drive or driven element in order to transmit the torque from the drive element to the driven element. The counter disks belonging to the respective embodiment of the friction device 1 can be designed according to the prior art. Thus the inner disks in a friction device 1 according to FIGS. 1 to 3 can be connected by the torque transmission elements 8 on the outer periphery 7 in a rotationally secure manner to a shaft, e.g. by means of a spline.

In the preferred embodiment of the friction device 1 however the two embodiments according to FIGS. 3 and 4 are combined with one another, i.e. the outer disks are designed according to FIG. 3 and the inner disks are designed according to FIG. 4 and are combined into a friction package, as shown in FIG. 1. In the latter alternating the axial direction 5 an outer disk is arranged according to the disks 4 of FIG. 3 and an inner disk is arranged according to the disks 4 of FIG. 4.

The figures show the respective torque transmission elements 8 with a rectangular cross-section in plan view. The torque transmission elements 8 can also have another form, for example can be quadratic or trapezoidal.

Furthermore, the edges of the torque transmission elements 8 are provided with a rounding.

Figure 6:
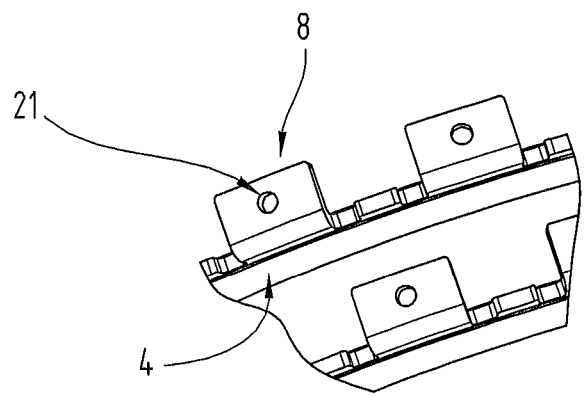
FIG. 6 shows a detail of an embodiment of the friction device.
Figure 7:
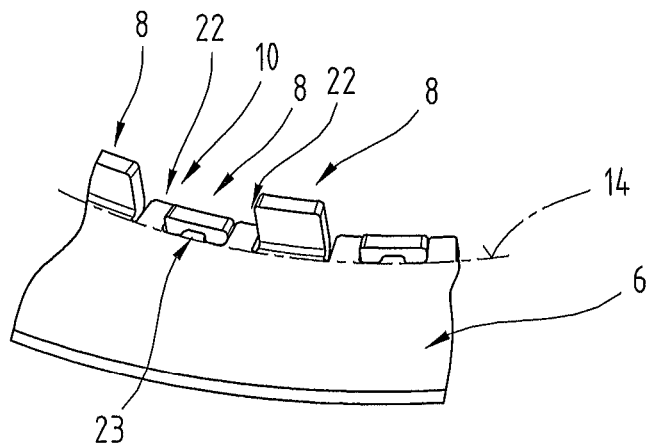
FIG. 7 shows a detail of another embodiment of the friction device.

FIGS. 6 and 7 show details of additional and possibly independent embodiments of the friction device 1 (FIG. 1), wherein the same reference numerals and component names are used for the same parts as in the preceding FIGS. 1 to 5. To avoid unnecessary repetition reference is made to the detailed description of FIGS. 1 to 5.

As shown in FIG. 6, the torque transmission elements 8 can comprise respectively at least one recess, in particular an opening 21. By means of said recess, in particular the opening 21, it is easier to oil the disks 4.

According to a further embodiment, which is represented in FIG. 7, at least one torque transmission lug 22 is arranged in the gaps 10 between the torque transmission elements 8, which torque transmission lug extends at least approximately in radial direction. Preferably, two torque transmission lugs 22 are provided, one of which is arranged respectively directly next to a torque transmission element 8 so that the torque transmission elements 8 are surrounded on both sides by torque transmission lugs 22. The latter bring about the transmission of force of the torque transmission element 8 on the support element rear wall 3. The force thus only acts on one side.

FIG. 7 shows a further embodiment. The disks can have rotational alignment elements 23. The rotational alignment elements 23 are used for centering and aligning the next closest respective disk. Preferably, at least one of said rotational alignment elements 23 is arranged between two torque transmission elements 8, possibly between two torque transmission lugs 22. Preferably, the rotational alignment elements 23 extend at least approximately in radial direction and if necessary are designed to be spaced apart from the torque transmission elements 8, possibly the torque transmission lugs 22. The rotational alignment elements 23 are designed in particular as radial projections over the inner periphery 14 (or the outer periphery 7) of the main disk body 6.

Furthermore, according to another embodiment, preferably if the torque transmission elements 8 are formed in one piece with the respective disk 4. However, they can also be produced as separate components and connected to the main disk body 6, for example by means of a form-fitting connection.

As the disks 4 can be used not only to form part of the support element 2, but can also be used as friction disks, as already described above, the invention also relates to a friction disk for the friction device 1. The latter comprises the annular main disk body 6 which on its outer periphery 7 or inner periphery 14 comprises a plurality of torque transmission elements 8, and on which if necessary at least one friction lining 16 is arranged. The torque transmission elements 8 are arranged at an angle to the main disk body 6, as already described above.

For the production of the disks 4 for the friction device 1 or friction disk firstly the annular main disk body 6 is provided and the torque transmission elements 8 are formed on the latter on the outer or inner periphery of the main disk body 6, wherein gaps 10 are formed between the torque transmission elements 8. Said steps can be performed for example by stamping from sheet metal.

The torque transmission elements 8 still run in radial direction with this blank disk. In order to form the aforementioned torque transmission elements 8 the latter are now bent at an angle relative to the main disk body 6. Reference is made to explanations above regarding the angle.

The embodiments show possible embodiments or details of the friction device 1, however it should be noted that various different combinations of the individual embodiments are possible.

Lastly, as a point of formality it should be noted that for a better understanding of the structure of the friction device 1 the latter has not necessarily been drawn to scale.

LIST OF REFERENCE NUMERALS 1 friction device
2 support element
3 support element rear wall
4 disk
5 axial direction
6 main disk body
7 outer periphery
8 torque transmission element
9 peripheral direction
10 gap
11 width
12 length
13 thickness
14 inner periphery
15 gap width
16 friction lining
17 outer periphery
18 tooth
19 tooth gap
20 shaft
21 opening
22 torque transmission lug
23 rotational alignment element

The invention claimed is:

1. A friction device comprising a cage-like support element, wherein the support element has a cage casing, wherein the cage casing is formed by a plurality of disks which are arranged consecutively in an axial direction, which have an annular main disk body and which comprise respectively a plurality of axially extending torque transmission protrusions on their outer periphery or on their inner periphery, wherein gaps are formed respectively between the torque transmission protrusions in a peripheral direction of the disks, and the torque transmission protrusions of the respectively adjacent disk engage in the gaps of the disks,
wherein the torque transmission protrusions engaging in the gaps bear respectively on both sides on torque transmission protrusions of the disk comprising said gaps.

2. The friction device as claimed in claim 1, wherein the torque transmission protrusions are arranged at an angle to the main disk body, which is selected from a range of 45° to 110°.

3. The friction device as claimed in claim 1, wherein the disks further comprise rotational alignment projections.

4. The friction device as claimed in claim 1, wherein in the gaps between the torque transmission protrusions at least one torque transmission lug is arranged which extends at least approximately in radial direction.

5. The friction device as claimed in claim 1, wherein the torque transmission protrusions comprise a respective recess.

6. The friction device as claimed in claim 1, wherein on the main disk body of the disks at least one friction lining is arranged.

7. The friction device as claimed in claim 1, wherein the torque transmission elements are formed in one piece with the annular main disk body of the respective disk.

8. A method for producing a friction device as claimed in claim 1, comprising the steps:
   providing an annular main disk body,
   forming torque transmission protrusions on an outer or inner periphery of the main disk body such that a first friction disk is formed, wherein gaps are formed between the torque transmission elements,
   wherein the torque transmission protrusions are bent at an angle relative to the main disk body
   repeating the previous two steps such that a second friction disk is formed,
   coupling the first friction disk to the second friction disk in that the torque transmission protrusions of the first friction disk engage in the gaps of the second friction disk and such that the first friction disk and the second friction disk are arranged consecutively in an axial direction, wherein the first friction disk and the second friction disk together form a cage casing, wherein the torque transmission protrusions of the first friction disk bear respectively on both sides on the torque transmission protrusions of the second friction disk.

9. A friction device comprising a cage-like support element, wherein the support element has a cage casing, wherein the cage casing is formed by a plurality of disks which are arranged consecutively in an axial direction, which have an annular main disk body and which comprise respectively a plurality of axially extending torque transmission protrusions on their outer periphery or on their inner periphery, wherein gaps are formed respectively between the torque transmission protrusions in a peripheral direction of the disks, and the torque transmission protrusions of the respectively adjacent disk engage in the gaps of the disks,
   wherein the torque transmission protrusions comprise a respective recess wherein the torque transmission protrusions engaging in the gaps bear respectively on both sides on torque transmission protrusions of the disk comprising said gaps.

* * * * *